US010878190B2

(12) United States Patent
Bhatt et al.

(10) Patent No.: US 10,878,190 B2
(45) Date of Patent: Dec. 29, 2020

(54) STRUCTURED DICTIONARY POPULATION UTILIZING TEXT ANALYTICS OF UNSTRUCTURED LANGUAGE DICTIONARY TEXT

(71) Applicant: International Business Machines Corporation, Armonk, NY (US)

(72) Inventors: Dhruv A. Bhatt, Indian Trail, NC (US); Bhargav Cheenepalli, Charlotte, NC (US); Kristin E. McNeil, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 15/138,712

(22) Filed: Apr. 26, 2016

(65) Prior Publication Data

US 2017/0308524 A1    Oct. 26, 2017

(51) Int. Cl.
*G06F 40/242* (2020.01)
*G06F 16/36* (2019.01)
(Continued)

(52) U.S. Cl.
CPC ............ *G06F 40/242* (2020.01); *G06F 16/22* (2019.01); *G06F 16/285* (2019.01); *G06F 16/3338* (2019.01); *G06F 16/36* (2019.01); *G06F 16/374* (2019.01); *G06F 40/169* (2020.01); *G06F 40/247* (2020.01)

(58) Field of Classification Search
CPC .......... G06F 17/02; G06F 17/03; G06F 16/36; G06F 16/16367; G06F 13/374; G06F 16/258; G06F 17/30569; G06F 17/30731; G06F 17/30734; G06F 17/30737; G06F 16/367; G06F 16/374; G06F 16/3338; G06F 40/242

See application file for complete search history.

(56) References Cited

U.S. PATENT DOCUMENTS 6,529,864 B1 * 3/2003 Chase ..................... G06F 40/20
704/9
6,983,287 B1 * 1/2006 Jayanti .............. G06F 17/30038
(Continued)

FOREIGN PATENT DOCUMENTS

WO    2010089248 A1    8/2010

OTHER PUBLICATIONS

Fulda, et al., "TimeLine Curator: Interactive Authoring of Visual Timelines from Unstructured Text", IEEE Transactions on Visualization and Computer Graphics, vol. 22, No. 1, Jan. 2016, pp. 300-309.

(Continued)

*Primary Examiner* — Marc S Somers
(74) *Attorney, Agent, or Firm* — Joseph Polimeni; Edell, Shapiro & Finnan, LLC (57) ABSTRACT

A structured dictionary in a database is populated from unstructured text stored in a data repository. Dictionary text is retrieved from the data repository and a dictionary term and an associated dictionary definition are identified from the dictionary text. A database category is determined for the dictionary term from the associated dictionary definition. An indication of the dictionary term is stored in the structured dictionary in association with the database category.

19 Claims, 4 Drawing Sheets

(51) Int. Cl.
*G06F 40/169* (2020.01)
*G06F 40/247* (2020.01)
*G06F 16/33* (2019.01)
*G06F 16/22* (2019.01)
*G06F 16/28* (2019.01)

(56) References Cited

U.S. PATENT DOCUMENTS

| | | | |
|---|---|---|---|
| 7,136,876 B1* | 11/2006 | Adar | G06F 17/2735 |
| 7,383,169 B1* | 6/2008 | Vanderwende | G06F 17/2785 |
| | | | 704/9 |
| 7,822,768 B2 | 10/2010 | Maymir-Ducharme et al. | |
| 8,280,903 B2 | 10/2012 | Broder et al. | |
| 8,775,419 B2 | 7/2014 | Chiticariu et al. | |
| 8,996,532 B2 | 3/2015 | Bhatt et al. | |
| 9,146,711 B1 | 9/2015 | Boudreau et al. | |
| 9,519,706 B2* | 12/2016 | Luke | G06F 17/2705 |
| 9,672,497 B1* | 6/2017 | Lewis | G06F 17/277 |
| 2003/0088562 A1 | 5/2003 | Dillon et al. | |
| 2003/0140309 A1* | 7/2003 | Saito | G06F 16/345 |
| | | | 715/259 |
| 2006/0080315 A1* | 4/2006 | Mitchell | G06F 17/30684 |
| 2008/0096605 A1* | 4/2008 | Gissin | H04L 67/04 |
| | | | 455/556.2 |
| 2009/0182755 A1* | 7/2009 | Adair | G06F 17/30312 |
| 2010/0185438 A1 | 7/2010 | De La Cruz | |
| 2011/0313852 A1* | 12/2011 | Kon | G06Q 30/0247 |
| | | | 705/14.46 |
| 2013/0138425 A1* | 5/2013 | Luke | G06F 17/2705 |
| | | | 704/9 |
| 2013/0197938 A1 | 8/2013 | Bayouk et al. | |
| 2013/0325882 A1 | 12/2013 | Deshpande et al. | |
| 2014/0283055 A1 | 9/2014 | Zahran | |
| 2014/0330792 A1 | 11/2014 | Bhatt | |
| 2015/0106079 A1 | 4/2015 | Bostick et al. | |
| 2015/0324431 A1 | 11/2015 | Cheng et al. | |

OTHER PUBLICATIONS

Keretna, et al., "A Hybrid Model for Named Entity Recognition Using Unstructured Medical Text," 2014 9th International Conference on System of Systems Engineering (SOSE), Jun. 9-Jun. 13, 2014, pp. 85-90, Adelaide, Australia.

Lomotey et al., "Analytics-as-a-Service (AaaS) Tool for Unstructured Data Mining Towards Knowledge Discovery in Big Data", 2014 IEEE International Conference on Cloud Engineering, Mar. 11-14, 2014, pp. 319-324, Boston, MA.

"Extensible framework for automated extraction of information about identities from unstructured information sources", IPCOM000240102, Jan. 12, 2015, 8 pages.

* cited by examiner

STRUCTURED DICTIONARY POPULATION UTILIZING TEXT ANALYTICS OF UNSTRUCTURED LANGUAGE DICTIONARY TEXT

BACKGROUND

1. Technical Field

Present invention embodiments relate to natural language processing, and more specifically, to populating text analytic dictionaries from data extracted from unstructured dictionary text.

2. Discussion of the Related Art

Advancements in information technology (IT) have led to unprecedented volumes of information being collected, stored and processed. Linguistic meaning in unstructured text is extracted by natural language processing (NLP) techniques in accordance with an established information model, and structured information conveying the meaning of the text is integrated into a database as metadata descriptive of, and often logically associated with the scrutinized text. Such metadata may be queried and analyzed, including by way of NLP techniques, to identify various characteristics of the underlying data items, offering analytical benefits and advantages in varied fields of endeavor, such as finance and medicine.

To maximize relevant query results, certain IT systems may employ a query expansion technique in which an original query is substituted with variants. For example, in certain query expansion techniques, a query term is substituted with a synonym and independent searches are performed on the query term and the synonym. The results from each query thread are subsequently joined. In principle, the larger the number of different variants that are tried at query time, the higher the potential quality of the returned results, assuming that a good joining technique is in place.

High-quality information extraction and structured information queries thus rely on exhaustive dictionaries of words, phrases, synonyms, etc. and a complication in employing dictionary-based NLP techniques is in maintaining an up-to-date and complete dictionary. Manual techniques for creating or otherwise populating text analytic dictionaries are typically expensive, labor-intensive and prone to error, and often result in underpopulated dictionaries with respect to the overall content of the data on which they are based.

SUMMARY

A structured dictionary in a database is populated from unstructured text stored in a data repository. Dictionary text is retrieved from the data repository and a dictionary term and an associated dictionary definition are identified from the dictionary text. A database category is determined for the dictionary term from the associated dictionary definition. An indication of the dictionary term is stored in the structured dictionary in association with the database category.

BRIEF DESCRIPTION OF THE DRAWINGS

Generally, like reference numerals in the various figures are utilized to designate like components.

DETAILED DESCRIPTION

Figure 1:
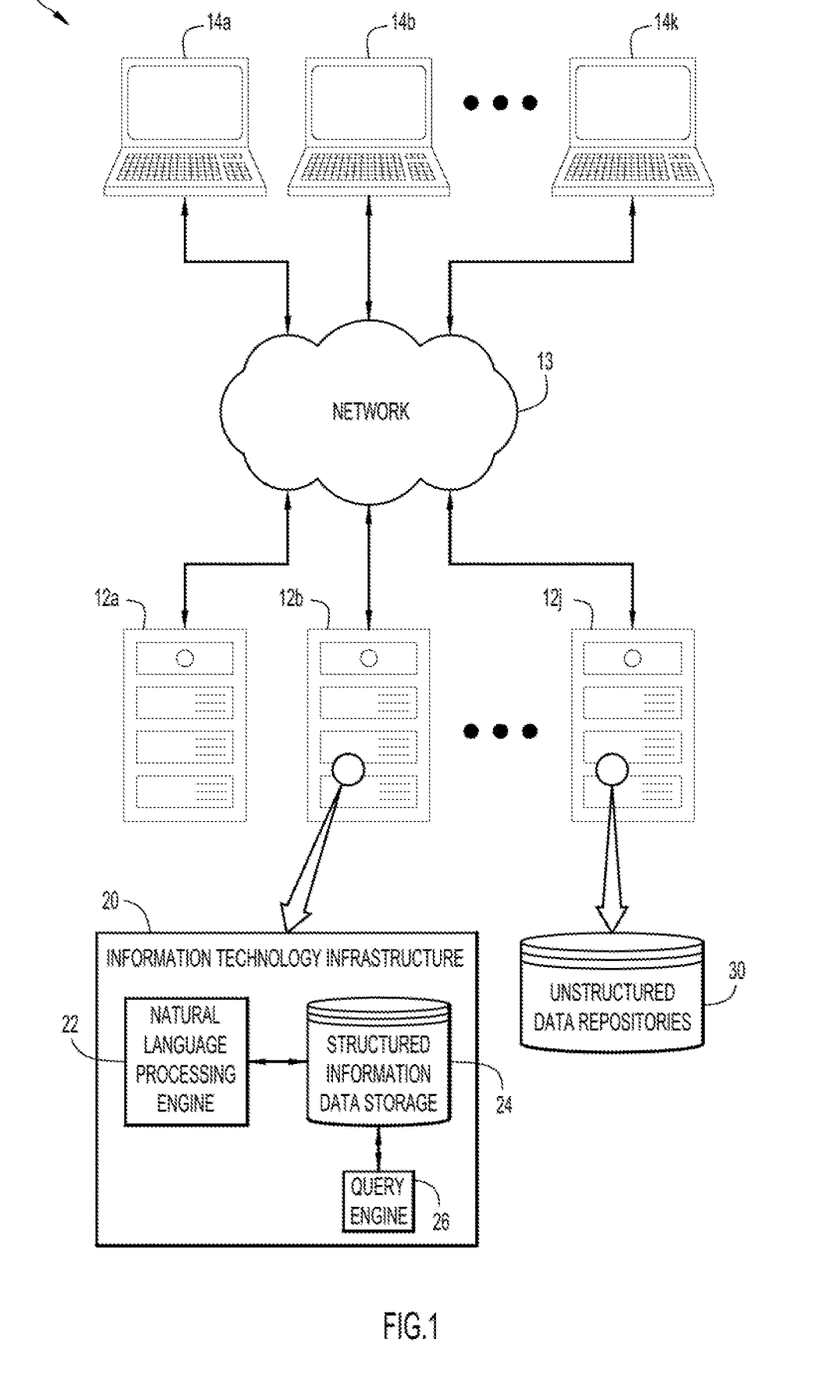
FIG. 1 is a schematic block diagram of an example environment in which the present invention can be embodied.

An example environment for use with present invention embodiments is illustrated in FIG. 1 as network infrastructure 10. As is illustrated, the environment includes one or more server systems 12a-12j, representatively referred to herein as server system(s) 12, and one or more client or end-user systems 14a-14k, representatively referred to herein as client system(s) 14. Server systems 12 and client systems 14 may be remote from each other and may communicate over a network 13. Network 13 may be implemented through any number of suitable communications media, e.g., metallic conductors, optical fiber, air, etc. using one or more signaling techniques and possibly in accordance with one or more standardized communication protocols, e.g., Internet Protocol (IP), Transport Control Protocol (TCP), User Datagram Protocol (UDP), etc. Network 13 may be supported by suitable hardware components to implement wide area networks (WAN), local area networks (LAN), internets, intranets, etc. Alternatively, server systems 12 and client systems 14 may be sufficiently local to each other to communicate with each other through direct or line-of-sight techniques, e.g., wireless radio links, fiber-less optical links, etc. In certain implementations, services and functionality of server systems 12 and those of client systems 14 may be performed by common circuitry and shared computational resources in a single device such as a workstation.

Server systems 12 and client systems 14 may be implemented by any conventional or other computer systems preferably equipped with a display or monitor, a base (e.g., including at least one processor (not illustrated), one or more memories (not illustrated) and/or internal or external network interfaces or communications devices, e.g., modem, network cards, etc. (not illustrated), optional input devices, e.g., a keyboard, mouse or other input device (not illustrated), and any commercially available, open-source and custom software, e.g., operating system, server/communications software, browser/interface software, etc.

One or more client systems 14 and/or one or more server systems 12 may be constructed or otherwise configured to implement an information technology infrastructure (ITI) 20. ITI 20 represents a unified framework by which enterprise data are collected, stored, retrieved and managed. To that end, ITI 20 may implement a structured information data storage component 24, in which structured information are stored. Additionally, ITI 20 may include a query engine 26, by which the information in structured information data storage component 24 is searched according to user-selected query criteria. The present invention is not limited to specific implementations of structured information data storage component 24 and query engine 26. Indeed, upon review of this disclosure, those having skill in information technology will recognize numerous query engines and structured information data storage techniques that can be used in conjunction with the present invention without departing from the spirit and intended scope thereof.

ITI 20 may implement a natural language processing (NLP) engine 22 that, among other things, identifies entities or objects in unstructured text of a document, determines relationships between those entities, produces structured information data from the unstructured input text based on the determined relationships between entities and stores that information data in structured information data storage 24. NLP engine 22 may identify entities or objects and variations of the entities or objects by matching text tokens or words in the unstructured text to entries in one or more text analytic dictionaries. As used herein, a "text analytic dictionary" is a data structure stored in a computer memory, e.g., a database, such that textual terms, e.g., key terms, variations of the key terms and parts of speech of the key terms, are grouped into or associated with a relevant class or category. A text analytic dictionary is populated when a dictionary item is associated with its relevant dictionary category. Text analytical dictionary entries represent the entities or objects in the unstructured text. Upon review of this disclosure, those having skill in the art will recognize numerous NLP systems and techniques that can be used in conjunction with the present invention without departing from the spirit and intended scope thereof.

Unstructured input text may be obtained from unstructured data repositories 30, which may be implemented on one or more client systems 14 and/or on one or more server systems 12 connected to network 13. Accordingly, data repositories 30 may be a part of ITI 20 or may be external to ITI 20, such as would be found as a collection of web pages on the World Wide Web. The present invention is not limited to particular data or storage configurations for data repositories 30.

NLP engine 22 may collect and process unstructured input text in accordance with an established information model so that the processed data may be integrated into the information scheme of ITI 20. An "information model," as used herein, represents the linguistic concepts for each domain of discourse realized in ITI 20, as well as the relationships between those concepts, constraints, rules, and operations by which textual content is construed to derive its underlying semantics. An information model may encompass multiple ontologies, where an "ontology," as used herein, is a specification of linguistic entities by which meaning is conveyed between agents in a domain of discourse. An ontology includes, without being limited to, the lexicography, morphologies, grammatical and syntactical rules, special patterns of text, etc., for the domain of discourse. Ontologies may include local and/or general ontologies, which may specify general language and enterprise-internal linguistic entities, and domain-specific ontologies, which specify linguistic entities of highly-specialized domains of discourse, e.g., those having idiosyncratic vocabularies and/or morphologies, such as in the fields of healthcare, law, finance, scientific research, etc. The present invention is not limited to a specific technique in which ontologies are realized in an information technology infrastructure 20. Upon review of this disclosure, those having skill in computational linguistics will recognize different techniques by which ontologies may be realized in particular information integration applications without departing from the spirit and intended scope of the present invention.

Figure 2:
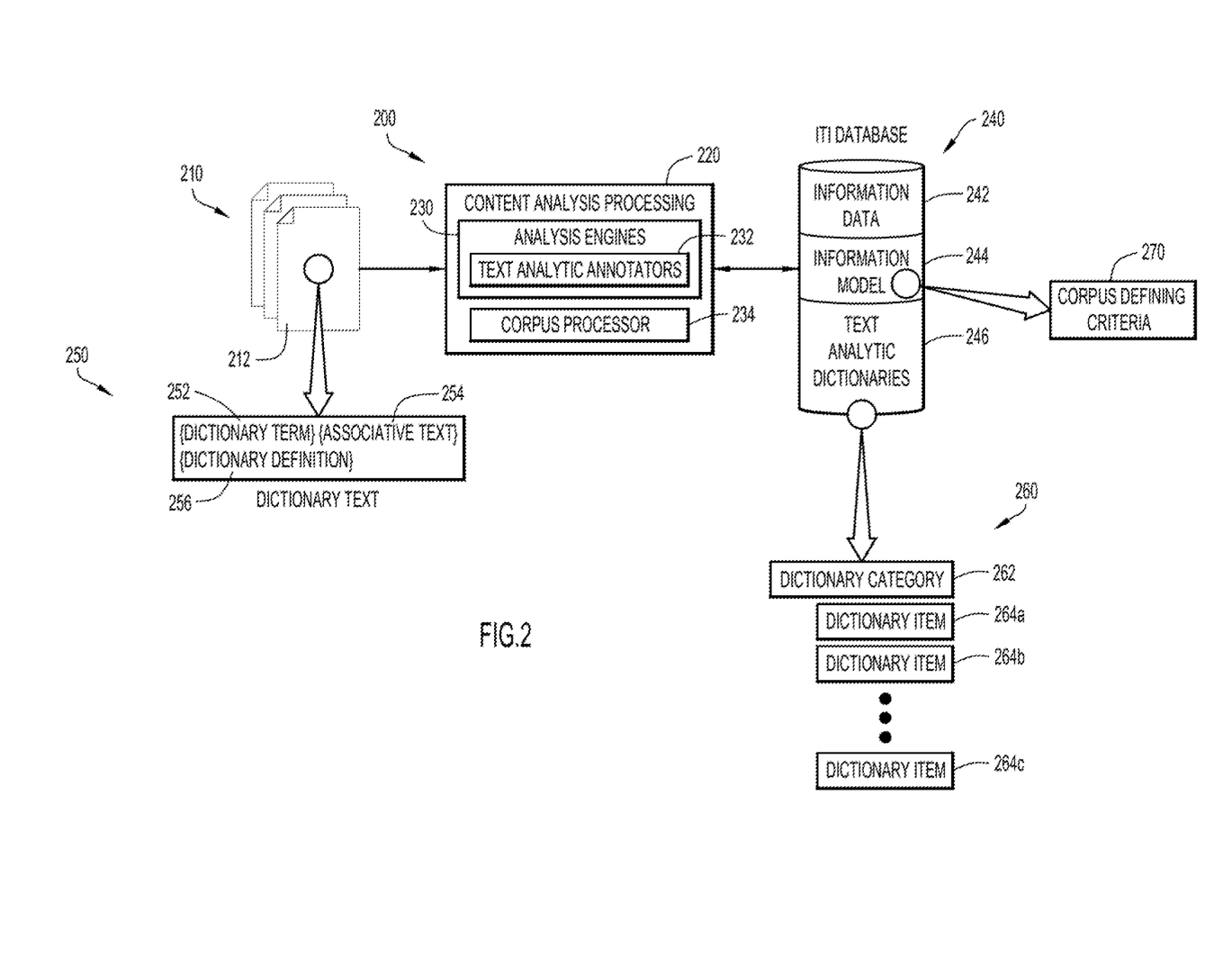
FIG. 2 is a schematic block diagram of an example dictionary populating processing configuration of an embodiment of the present invention.

FIG. 2 is a schematic block diagram of an exemplary dictionary processing component 200, which may be implemented on or otherwise supported by resources of ITI 20. Dictionary processing component 200 may be constructed or otherwise configured to extract dictionary terms and feature values (metadata) from unstructured data of a selected corpus. As illustrated in FIG. 2, information data 242, an information model 244, and text analytic dictionaries 246 may be maintained on an ITI database 240. Information data 242 may be structured data comprising metadata produced for regions of text in accordance with an information model 244. Text analytic dictionaries 246 may be constructed to identify and/or characterize unstructured text in accordance with information model 244. Information data 242 may be made available to various applications, e.g., query engine 26 executing on ITI 20. ITI database 240 may be implemented by any conventional or other database or storage unit, may be local to or remote from server systems 12 and client systems 14, and may communicate via any appropriate communication mechanism, e.g., local area network (LAN), wide area network (WAN), Internet, hardwire, wireless link, Intranet, etc.

Content analysis processing (CAP) component 220 may be implemented on NLP engine 22 to interpret and/or characterize the content of input documents in embodiments of the present invention. To that end, CAP component 220 may include one or more analysis engines 230, which are processor-executable agents that analyze input documents, e.g., documents 210, in view of information model 244. Such analysis may infer and record descriptive attributes about the documents as a whole and/or about regions or document sections therein. The descriptive information generated by analysis engines 230 may take the form of metadata about the document content, which may be stored as information data 242. CAP component 220 may be realized in a variety of ways, including by one of many currently available open-source and commercial content analytics platforms. For example, CAP component 220 may be based on the Unstructured Information Management Architecture (UIMA) standardized by the Organization for the Advancement of Structured Information Standards (OASIS). Upon review of this disclosure, skilled artisans will recognize various content analytic implementations in which the present invention can be embodied without departing from the spirit or intended scope thereof.

The core analysis processing in an analysis engine 230 is performed by one or more text analytic annotators 232; analysis engine 230 may provide application programming interfaces (APIs) and infrastructure support for text analytic annotators 232. In certain embodiments, text analytic annotators 232 are processor-executable agents that produce and record annotations over regions of a document in accordance with information model 244. An "annotation," as used herein, is an association of informative metadata with a region of text in the document. Such associations are intended to convey meaning and, to that end, text analytic annotators 232 may perform such tasks as, for example, detecting source language and character encoding of the document content, tokenizing the text into words, identifying the parts of speech of different words, finding meaningful word phrases, e.g., noun phrases or adjective-noun pairs, automatically extracting named entities from the text, such as people, locations, and organizations, categorizing and classifying the content items, finding typical and custom patterns in the text through general purpose and custom-defined regular expressions, and searching for relevant general and custom-defined dictionary terms contained in text analytic dictionaries 246, a general example of which is illustrated at text analytic dictionary 260.

In FIG. 2, documents 210 represent potentially large volumes of unstructured or semi-structured textual data, retrieved from, for example, data repositories 30, from which information is to be extracted. Documents 210 may be collected, structured, analyzed and processed by CAP component 220 and the underlying information may be stored in ITI database 240 as information data 242. Documents 210 may be confined to a particular topic of the ontology on which information model 244 is based. For example, when a medical domain of discourse is targeted, online medical texts including dictionaries, encyclopedias, journal articles, etc., may be logically assembled into a source corpus. To that end, embodiments of the present invention may implement corpus defining criteria 270 that specify the documents from which dictionary terms and dictionary definitions are to be extracted. Corpus defining criteria 270 may be provided to corpus processor 234, which iterates through the documents in the corpus, as defined by corpus defining criteria 270, in search of dictionary terms, definitions and categories. In one illustrative embodiment, corpus processor 234 includes a suitable mechanism, such as a web crawler, configured to parse and index documents on the World Wide Web. Corpus defining criteria 270 may include a set of uniform resource locators (URLs) of specific locations on the World Wide Web that contain information related to a particular domain of discourse. Locations (documents, websites, etc.) on the World Wide Web that are known to contain information outside the target domain of discourse may be excluded from the set of URLs to define a particular corpus of a known ontology. Corpus defining criteria 270 may be established by a user through a suitable user interface on, for example, a client system 14.

As illustrated in FIG. 2, text analytic dictionary 260 may comprise a dictionary category 262 in logical association with one or more dictionary items 264a-264n, representatively referred herein as dictionary item(s) 264. As an example, one dictionary category 262 may be "Disease," which may be associated with terms "Diabetes," "Hepatitis," "Influenza," etc. Each of these terms may be contained in a corresponding dictionary item 264. In certain embodiments, such terms may also be logically associated with metadata in dictionary item 264, e.g., a dictionary definition associated with the term in the dictionary document, synonyms, etc.

Document collection 210 may form a specified corpus and may include dictionary documents 212, which, as used herein, are documents containing unstructured dictionary text 250. Dictionary text 250 is a passage or portion of text that contains a dictionary term 252, dictionary definition 256 and associative text 254 that associates dictionary term 252 with dictionary definition 256. As used herein, a "dictionary definition" is a statement of meaning of a "dictionary term". A dictionary term may have multiple dictionary definitions. A dictionary term and its associated dictionary definitions may form a "dictionary entry" in a dictionary document 212.

Text analytic annotators 232 may be constructed or otherwise configured to annotate a dictionary entry, i.e., text containing a dictionary term and one or more associated dictionary definitions, in accordance with one or more dictionary annotation rules that, using the APIs of analysis engine 230, distinguish specific portions of dictionary entries. One implementation may identify associative text that associates a dictionary term with its dictionary definition. For example, certain dictionary annotator embodiments may be constructed or otherwise configured with an associative text rule for the phrase "is a" that identifies "dictionary term" and "dictionary definition" from the syntax of "X is a Y" implies "Y is a definition of X." Similar rules can be established for phrases such as "means," "refers to," "by definition," etc. Those having skill in computational linguistics will recognize numerous dictionary definition constructs in which both "dictionary term" and "dictionary definition" can be identified from dictionary text.

Certain embodiment text analytic annotators 232 may be constructed or otherwise configured to identify dictionary terms and definitions from associative text. For example, text analytic annotators 232 may be constructed or otherwise configured to identify dictionary terms and associated definitions from online encyclopedias, online textbooks and scholarly articles. Those having skill in computational linguistics will recognize other sources of dictionary documents upon review of this disclosure.

Figure 3:
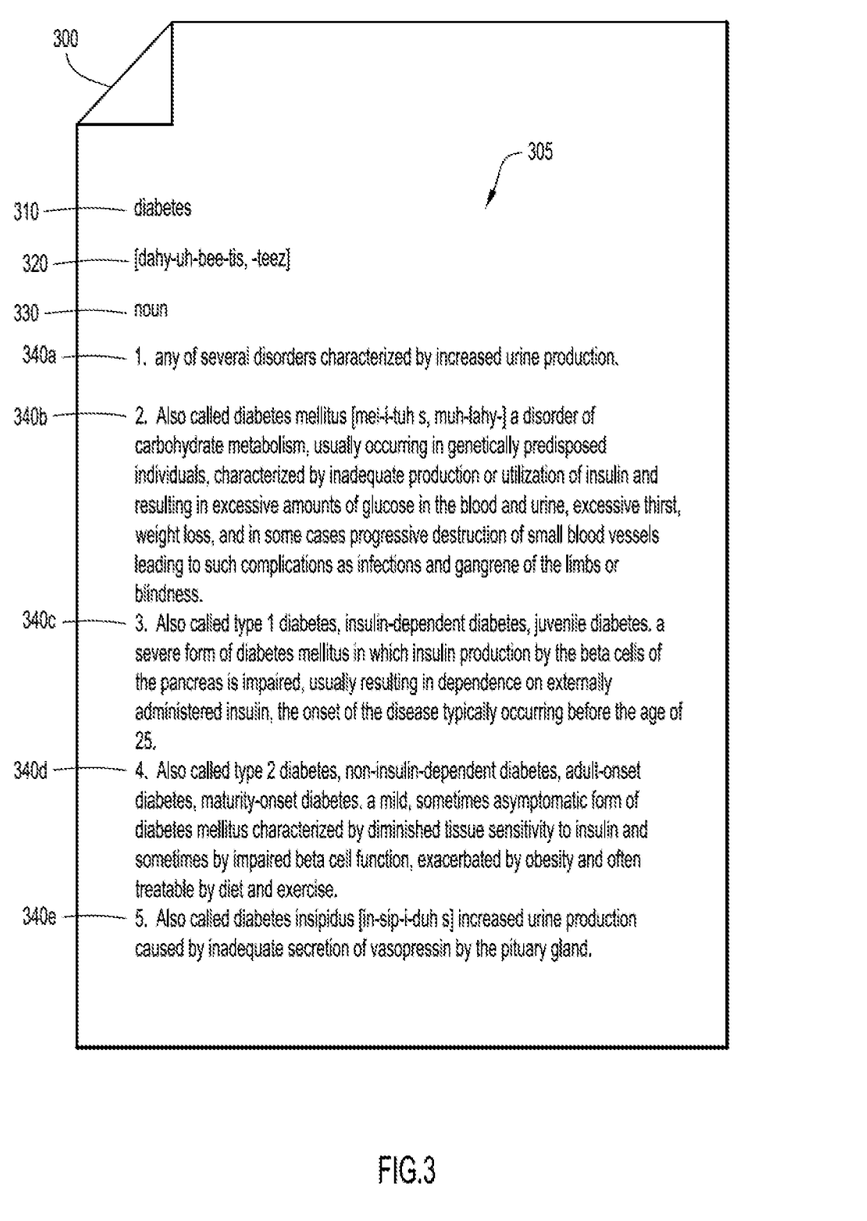
FIG. 3 is a diagram illustrating an example dictionary document that may serve as input text to embodiments of the present invention.

Text analytic annotators 232 may be constructed or otherwise configured to annotate dictionary entries that conform to well-established dictionary entry formats, such as that illustrated in exemplary dictionary document 300 illustrated in FIG. 3. Dictionary document 300 may be, for example, a web page from a dictionary web site (e.g., Dictionary.com, Wiktionary.org, etc.) on the World Wide Web, although the present invention is not so limited. As is illustrated in FIG. 3, a dictionary entry 305 in dictionary document 300 includes a dictionary term 310, term pronunciation 320, part of speech descriptor 330, and one or more definitions 340a-340e, representatively referred to herein as definition(s) 340. Depending on the dictionary term being defined, dictionary document 300 may include other fields, such as word origins, synonyms and other related information that can be used in populating text analytic dictionaries or as features (metadata) of existing dictionary items. Text analytic annotators 232 may be constructed or otherwise configured to identify particular fields of a dictionary entry 305 as associative text. For example, a text analytic annotator 232 may recognize term pronunciation 320 and part of speech descriptor 330 as associating dictionary term 310 with dictionary definitions 340. Additionally, a text analytic annotator 232 may identify numerals preceding definitions 340 as identifying different definitions 340. It is to be understood that different definitions 340 may establish different categories, and therefore different text analytic dictionaries, for a given dictionary term 310.

Text analytic annotators 232 may utilize the APIs of analysis engines 230 to determine a dictionary category from dictionary entry text 250. For example, dictionary annotator 234 may tokenize the dictionary definition text into words, identify the parts of speech of different words, find meaningful word phrases, e.g., noun phrases or adjective-noun pairs, automatically extract named entities from the text, such as people, locations, and organizations and categorize and classify the content items, finding typical and custom patterns in the text through general purpose and customer-defined regular expressions, and searching for relevant general and custom-defined dictionary terms. Those having skill in information extraction will recognize numerous content analysis and natural language processing paradigms, and physical implementations thereof, that can be used in conjunction with the present invention without departing from the spirit and intended scope thereof.

Figure 4:
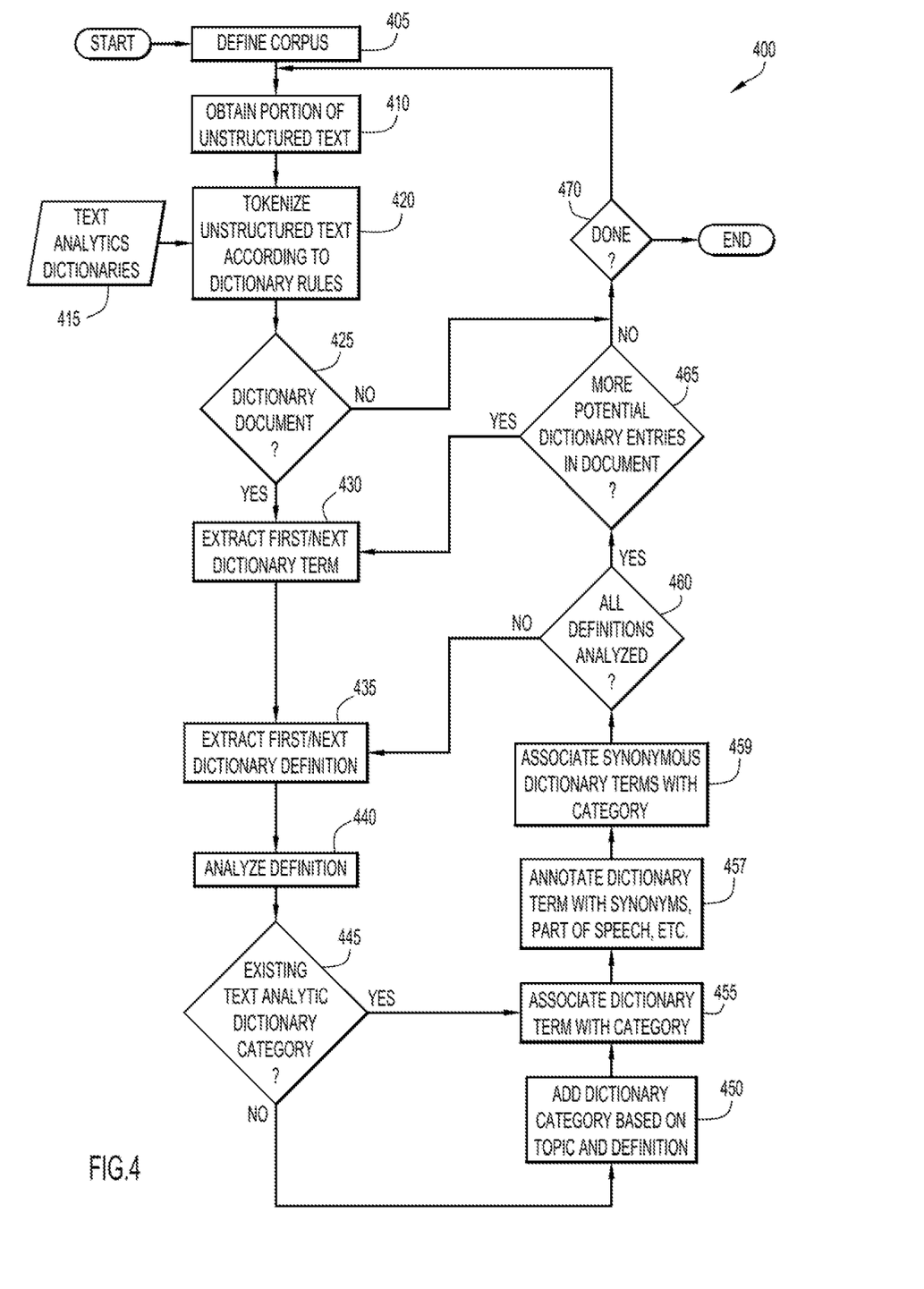
FIG. 4 is a flow diagram of an example dictionary populating process by which the present invention can be embodied.

FIG. 4 is a flow diagram of an exemplary text analytic dictionary populating process 400, which may be performed by, for example, CAP component 220. In operation 405, a corpus is defined via, for example, a user interface. The corpus may be defined as, for example, a list of URLs at which dictionary documents are located on the World Wide Web. The corpus may be defined to contain documents from specific sources, such as online dictionaries containing unstructured or semi-structured text from which dictionary entries are formed. In certain embodiments, user controls (not illustrated) may be provided, such as on a client system 14, by which a user may select URLs of specific documents, topics, etc., such as by selecting specific web sites known to contain dictionary documents.

In operation 410, a portion of unstructured text is obtained from the defined corpus and in operation 420, the unstructured text may be tokenized in accordance with established information extraction rules. For example, such tokenization may separate and identify different words, phrases and other parts of speech in accordance with one or more text analytic dictionaries 415. Additionally, the tokenization may identify associative text or other indicators of dictionary entries per dictionary annotation rules associated with a text analytic annotator. In operation 425, it is determined whether the currently scrutinized document is a dictionary document, i.e., one that contains dictionary entries. For example, if no associative text is found during tokenization operation 420, it can be established that the selected text is not dictionary text in which case process 400 transitions to operation 470. In operation 470, it is determined whether analysis of the corpus is done and, if not, process 400 transitions back to operation 410 and continues from that point. If, in operation 425, it is determined that a dictionary document has been retrieved from the corpus, process 400 may transition to operation 430, by which a first dictionary term is identified from the dictionary document. In operation 435, a first dictionary definition that is associated with the dictionary term is identified from the dictionary document. The dictionary term and the dictionary definition may be identified by associative text and/or other patterns of text that associates the dictionary term with its dictionary definition. In operation 440, the dictionary definition is analyzed to ascertain its meaning, such as by various content analytic processes. As discussed above, the text analysis may include tokenizing the dictionary definition text into words, identifying the parts of speech of different words, finding meaningful word phrases, e.g., noun phrases or adjective-noun pairs, automatically extracting named entities from the text, such as people, locations, and organizations and categorize and classifying the content items, finding typical and custom patterns in the text through general purpose and customer-defined regular expressions, and searching for relevant general and custom-defined dictionary terms.

In operation 445, it is determined whether a category gleaned from the meaning of the dictionary definition is represented in the text analytic dictionary and, if not, the dictionary category may be added to the text analytic dictionaries and/or a new text analytic dictionary may be created headed by the new dictionary category at operation 450. Process 400 may then transition to operation 455, by which the dictionary term is incorporated into the appropriate text analytic dictionary, if it is not already present. In operation 457, the dictionary term may be annotated with pertinent metadata, e.g., synonyms, parts of speech, etc., which are also stored with the dictionary term in the text analytic dictionary. In operation 459, synonyms of the dictionary term are added to the text analytical dictionary, i.e., associated with the relevant category. Process 400 may then transition to operation 460, by which it is determined whether all definitions in the dictionary document have been analyzed. If not, process 400 may transition to operation 435 and continue from that point. Otherwise, process 400 may transition to operation 465 by which it is determined whether other potential dictionary entries are present in the dictionary document. That is, it is determined whether there are other dictionary terms and associated dictionary definitions contained in the dictionary document. If so, process 400 may transition to operation 430 and continue from that point. Otherwise, process 400 may transition to operation 470, by which it is determined whether the process is to be terminated. If it is determined that process 400 is to continue, the process may transition to operation 410 and continue from that point.

Those having skill in information technology will recognize and appreciate that utilizing vast amounts of unstructured data, e.g., from documents on the World Wide Web and other sources, to populate text analytical dictionaries can result in higher dictionary populations over manual techniques.

A dictionary processing module may include one or more modules or units to perform the various functions of present invention embodiments described herein. The various modules (e.g., content analysis processing component 220, analysis engines 230, text analytic annotators 232 and dictionary annotators 234) may be implemented by any combination of any quantity of software and/or hardware modules or units, and may reside within memory of the server and/or client systems for execution by one or more processors of the server and/or client systems.

It will be appreciated that the embodiments described above and illustrated in the drawings represent only a few of the many ways of implementing embodiments for populating text analytic dictionaries.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, dictionary processing component, etc.). These systems may include any types of monitors and input devices (e.g., keyboard, mouse, voice recognition, etc.) to enter and/or view information.

It is to be understood that the software (e.g., dictionary population process 400) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., dictionary population process 400) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., information data 242, information model 244 and text analytic dictionaries 246). The database system may be implemented by any number of any conventional or other databases, data stores or storage structures (e.g., files, databases, data structures, data or other repositories, etc.) to store information (e.g., information data 242, information model 244 and text analytic dictionaries 246). The database system may be included within or coupled to the server and/or client systems. The database systems and/or storage structures may be remote from or local to the computer or other processing systems, and may store any desired data (e.g., documents 210).

The present invention embodiments may employ any number of any type of user interface (e.g., Graphical User Interface (GUI), command-line, prompt, etc.) for obtaining or providing information (e.g., information data 242, information model 244, text analytic dictionaries 234, documents 210, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for text analytic dictionary creation and/or populating using text from collected electronic documents.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for modifying a natural language processing engine for query processing, wherein the natural language processing engine employs a structured dictionary in a database, the method comprising:
    defining a corpus of documents by crawling a network for documents satisfying a set of criteria, wherein the set of criteria specify documents including information in unstructured form for an ontology associated with the structured dictionary;
    selecting a document with dictionary text in unstructured form from the corpus of documents, wherein the selected document includes one of a text book and an article;
    retrieving, by a processor, dictionary text in unstructured form from the selected document to update the structured dictionary employed by the natural language processing engine;
    identifying, by one or more text analytic annotators of the processor, from the dictionary text a dictionary term and a plurality of different associated dictionary definitions for the dictionary term, wherein the one or more text analytic annotators apply dictionary annotation rules indicating phrases in unstructured form with syntax identifying the dictionary term and an associated dictionary definition, and wherein at least two of the associated dictionary definitions correspond to different dictionary categories of the structured dictionary;
    determining, by the one or more text analytic annotators of the processor, the dictionary categories of the structured dictionary for the dictionary term from the associated dictionary definitions, wherein the structured dictionary includes a plurality of different dictionary categories each pertaining to a corresponding topic, and wherein each dictionary category includes one or more corresponding dictionary terms and dictionary definitions, and determining each dictionary category for the dictionary term comprises:

analyzing the associated dictionary definition by tokenizing the associated dictionary definition into words and identifying parts of speech of the words;

determining a meaning of the associated dictionary definition based on the analysis; and determining the dictionary category represented by the meaning of the associated dictionary definition;

storing, in the structured dictionary, an indication of the dictionary term in association with each of the dictionary categories to update the structured dictionary with the dictionary term identified from the dictionary text in unstructured form;

processing a query by the natural language processing engine utilizing the updated structured dictionary to expand the query and retrieve relevant results; and maintaining the structured dictionary up-to-date by updating the structured dictionary based on a new corpus of documents defined by crawling the network for documents after a previous update to the structured dictionary.

2. The method of claim 1, further comprising:

specifying, through a user interface to the processor, a set of locations on the network at which documents for the corpus are stored; and retrieving, by the processor, the dictionary text from the selected document at one of the locations on the network.

3. The method of claim 1, wherein identifying the dictionary term and the plurality of different associated dictionary definitions comprises:

analyzing the dictionary text against the dictionary annotation rules that define associative text; and determining the dictionary term and the plurality of different associated dictionary definitions from a relationship thereof with the associative text, the relationship being established by the dictionary annotation rules.

4. The method of claim 1, wherein storing the indication of the dictionary term comprises:

storing, by the processor, an indication of synonyms of the dictionary term in the structured dictionary in association with the dictionary categories of the dictionary term.

5. The method of claim 1, further comprising:

creating a new structured dictionary for a corresponding dictionary category upon determining that the corresponding dictionary category does not exist for the dictionary term.

6. The method of claim 1, further comprising:

generating dictionary term metadata for the dictionary term in accordance with the dictionary annotation rules; and storing the dictionary term in the structured dictionary in association with the dictionary term metadata.

7. The method of claim 1, wherein the dictionary annotation rules each indicate a specific phrase and a corresponding syntax in unstructured form and specify positions of the dictionary term and the associated dictionary definition within the specific phrase based on a relationship from the corresponding syntax.

8. An apparatus for modifying a natural language processing engine for query processing, wherein the natural language processing engine employs a structured dictionary in a database, the apparatus comprising:

a data storage unit configured to store the database;

a processor including one or more text analytic annotators and configured to:

define a corpus of documents by crawling a network for documents satisfying a set of criteria, wherein the set of criteria specify documents including information in unstructured form for an ontology associated with the structured dictionary;

select a document with dictionary text in unstructured form from the corpus of documents, wherein the selected document includes one of a text book and an article;

retrieve dictionary text in unstructured form from the selected document to update the structured dictionary employed by the natural language processing engine;

identify from the dictionary text a dictionary term and a plurality of different associated dictionary definitions for the dictionary term, wherein the one or more text analytic annotators apply dictionary annotation rules indicating phrases in unstructured form with syntax identifying the dictionary term and an associated dictionary definition, and wherein at least two of the associated dictionary definitions correspond to different dictionary categories of the structured dictionary;

determine the dictionary categories of the structured dictionary for the dictionary term from the associated dictionary definitions, wherein the structured dictionary includes a plurality of different dictionary categories each pertaining to a corresponding topic, and wherein each dictionary category includes one or more corresponding dictionary terms and dictionary definitions, and determining each dictionary category for the dictionary term comprises:

analyzing the associated dictionary definition by tokenizing the associated dictionary definition into words and identifying parts of speech of the words;

determining a meaning of the associated dictionary definition based on the analysis; and determining the dictionary category represented by the meaning of the associated dictionary definition;

store an indication of the dictionary term in association with each of the dictionary categories to update the structured dictionary with the dictionary term identified from the dictionary text in unstructured form;

process a query by the natural language processing engine utilizing the updated structured dictionary to expand the query and retrieve relevant results; and maintain the structured dictionary up-to-date by updating the structured dictionary based on a new corpus of documents defined by crawling the network for documents after a previous update to the structured dictionary.

9. The apparatus of claim 8, further comprising a user interface to the processor and wherein the processor is further configured to:

specify, through the user interface, a set of locations on the network at which documents for the corpus are stored; and retrieve the dictionary text from the selected document at one of the locations on the network.

10. The apparatus of claim 8, wherein the processor is further configured to:

analyze the dictionary text against the dictionary annotation rules that define associative text; and determine the dictionary term and the plurality of different associated dictionary definitions from a relationship thereof with the associative text, the relationship being established by the dictionary annotation rules.

11. The apparatus of claim 8, wherein the processor is further configured to:
   store an indication of synonyms of the dictionary term in the structured dictionary in association with the dictionary categories of the dictionary term.

12. The apparatus of claim 8, wherein the processor is further configured to:
   create a new structured dictionary for a corresponding dictionary category upon determining that the corresponding dictionary category does not exist for the dictionary term.

13. The apparatus of claim 8, wherein the processor is further configured to:
   generate dictionary term metadata for the dictionary term in accordance with the dictionary annotation rules; and
   store the dictionary term in the structured dictionary in association with the dictionary term metadata.

14. A computer program product for modifying a natural language processing engine for query processing, wherein the natural language processing engine employs a structured dictionary, the computer program product comprising one or more computer readable storage media collectively having program instructions embodied therewith, the program instructions being executable by a processor including one or more text analytic annotators to cause the processor to:
   define a corpus of documents by crawling a network for documents satisfying a set of criteria, wherein the set of criteria specify documents including information in unstructured form for an ontology associated with the structured dictionary;
   select a document with dictionary text in unstructured form from the corpus of documents, wherein the selected document includes one of a text book and an article;
   retrieve dictionary text in unstructured form from the selected document to update the structured dictionary employed by the natural language processing engine;
   identify from the dictionary text a dictionary term and a plurality of different associated dictionary definitions for the dictionary term, wherein the one or more text analytic annotators apply dictionary annotation rules indicating phrases in unstructured form with syntax identifying the dictionary term and an associated dictionary definition, and wherein at least two of the associated dictionary definitions correspond to different dictionary categories of the structured dictionary;
   determine the dictionary categories of the structured dictionary for the dictionary term from the associated dictionary definitions, wherein the structured dictionary includes a plurality of different dictionary categories each pertaining to a corresponding topic, and wherein each dictionary category includes one or more corresponding dictionary terms and dictionary definitions, and determining each dictionary category for the dictionary term comprises:
      analyzing the associated dictionary definition by tokenizing the associated dictionary definition into words and identifying parts of speech of the words;
      determining a meaning of the associated dictionary definition based on the analysis; and
      determining the dictionary category represented by the meaning of the associated dictionary definition;
   store in the structured dictionary an indication of the dictionary term in association with each of the dictionary categories to update the structured dictionary with the dictionary term identified from the dictionary text in unstructured form;
   process a query by the natural language processing engine utilizing the updated structured dictionary to expand the query and retrieve relevant results; and
   maintain the structured dictionary up-to-date by updating the structured dictionary based on a new corpus of documents defined by crawling the network for documents after a previous update to the structured dictionary.

15. The computer program product of claim 14, wherein the one or more computer readable storage media include further program instructions that cause the processor to:
   specify, through a user interface to the processor, a set of locations on the network at which documents for the corpus are stored; and
   retrieve the dictionary text from the selected document at one of the locations on the network.

16. The computer program product of claim 14, wherein the one or more computer readable storage media include further program instructions that cause the processor to:
   analyze the dictionary text against the dictionary annotation rules that define associative text; and
   determine the dictionary term and the plurality of different associated dictionary definitions from a relationship thereof with the associative text, the relationship being established by the dictionary annotation rules.

17. The computer program product of claim 14, wherein the one or more computer readable storage media include further program instructions that cause the processor to:
   store an indication of synonyms of the dictionary term in the structured dictionary in association with the dictionary categories of the dictionary term.

18. The computer program product of claim 14, wherein the one or more computer readable storage media include further program instructions that cause the processor to:
   create a new structured dictionary for a corresponding dictionary category upon determining that the corresponding dictionary category does not exist for the dictionary term.

19. The computer program product of claim 14, wherein the one or more computer readable storage media include further program instructions that cause the processor to:
   generate dictionary term metadata for the dictionary term in accordance with the dictionary annotation rules; and
   store the dictionary term in the structured dictionary in association with the dictionary term metadata.

\* \* \* \* \*